(12) United States Patent
Sabiron et al.

(10) Patent No.: US 7,690,625 B2
(45) Date of Patent: Apr. 6, 2010

(54) VALVE COMPRISING A MAGNETIC CONTROL DEVICE

(75) Inventors: Gerard Sabiron, Octeville sur Mer (FR); Jean-Jacques Serin, Octeville sur Mer (FR); Patrick Decarne, Octeville sur Mer (FR)

(73) Assignee: Sidel Participations, Octeville Sur Mer (FR)

( * ) Notice: Subject to any disclaimer, the term of this patent is extended or adjusted under 35 U.S.C. 154(b) by 589 days.

(21) Appl. No.: 10/593,286

(22) PCT Filed: Mar. 30, 2005

(86) PCT No.: PCT/FR2005/000774

§ 371 (c)(1),
(2), (4) Date: Sep. 18, 2006

(87) PCT Pub. No.: WO2005/098286

PCT Pub. Date: Oct. 20, 2005

(65) Prior Publication Data

US 2007/0246672 A1    Oct. 25, 2007

(30) Foreign Application Priority Data

Apr. 2, 2004    (FR) .................................. 04 03456

(51) Int. Cl.
*H01F 7/121*    (2006.01)

(52) U.S. Cl. .................. 251/129.14; 335/262; 335/280

(58) Field of Classification Search ............ 251/129.14, 251/65; 335/280, 279, 261, 262, 229
See application file for complete search history.

(56) References Cited

U.S. PATENT DOCUMENTS

| | | | | |
|---|---|---|---|---|
| 2,629,401 A | * | 2/1953 | Miller | 251/65 |
| 3,261,942 A | * | 7/1966 | Wessel | 335/280 |
| 3,355,145 A | * | 11/1967 | De Castelet Gaetan De Coye | 251/129.14 |
| 3,421,546 A | * | 1/1969 | Jennings et al. | 251/129.14 |

(Continued)

FOREIGN PATENT DOCUMENTS

DE    19 11 649 A    9/1970

(Continued)

OTHER PUBLICATIONS

JPO Action for Japanese Application No. 2007-505597 dated Sep. 15, 2009.

*Primary Examiner*—John Bastianelli
(74) *Attorney, Agent, or Firm*—Sughrue Mion, PLLC

(57) ABSTRACT

A valve including a shutter placed in a chamber which is arranged in the valve body and whose end is provided with a seat against which a plug-forming part of the shutter is pressed in the closed position of the valve and is remote in the open position thereof. The inventive valve also includes a magnetic control device provided with the shutter magnetic drive device disposed outside the chamber and displacing the shutter in the closed or open position thereof. The valve is characterized in that the magnetic control device includes at least one ball which is made of a magnetic material, disposed in the chamber and is coupled with an external magnetic drive device, wherein the ball is associated with the shutter in such a way that the shutter is driven in the chamber when the ball is moved by a magnetic drive device.

26 Claims, 5 Drawing Sheets

U.S. PATENT DOCUMENTS

| | | | | |
|---|---|---|---|---|
| 3,556,156 | A * | 1/1971 | Fuller, Jr. | 251/129.14 |
| 4,998,559 | A * | 3/1991 | McAuliffe, Jr. | 251/129.14 |
| 5,000,421 | A * | 3/1991 | Hendrixon et al. | 251/129.14 |
| 5,252,939 | A | 10/1993 | Riefler et al. | |
| 5,295,656 | A | 3/1994 | Campbell et al. | |
| 5,450,877 | A * | 9/1995 | Graffin | 251/65 |
| 5,597,013 | A * | 1/1997 | Ushakov | 251/129.14 |
| 5,606,992 | A * | 3/1997 | Erickson et al. | 251/129.14 |
| 5,711,344 | A * | 1/1998 | Mullally | 251/129.14 |
| 5,758,863 | A * | 6/1998 | Buffet et al. | 251/65 |
| 6,095,188 | A * | 8/2000 | Anderson et al. | 251/129.14 |
| 6,276,663 | B1 * | 8/2001 | Anderson et al. | 335/279 |
| 6,778,049 | B1 | 8/2004 | Alyanak | |
| 2002/0017324 | A1 | 2/2002 | Hisamura et al. | |

FOREIGN PATENT DOCUMENTS

| | | |
|---|---|---|
| DE | 19 31 799 A | 1/1971 |
| EP | 0 436 214 A | 7/1991 |
| FR | 2 688 286 A | 9/1993 |
| JP | 04-046284 A | 2/1992 |
| JP | 08-502338 A | 3/1996 |
| JP | 2001-146941 A | 5/2001 |
| JP | 2001-317650 A | 11/2001 |
| JP | 2002-54763 A | 2/2002 |

* cited by examiner

VALVE COMPRISING A MAGNETIC CONTROL DEVICE

FIELD OF THE INVENTION

The present invention concerns improvements to valves comprising a shutter moving in a chamber one end of which is provided with a seat which the shutter bears against in a closed position of the valve or is moved away from in an open position of the valve, and wherein the movement of the shutter is obtained by a magnetic control device disposed outside the chamber and magnetically coupled to the shutter.

Such valves are intended in particular to be used in food product filling machines, in particular for liquids.

DESCRIPTION OF THE PRIOR ART

The document EP 0436214 describes a magnetic valve equipped with a shutter and a control member outside the tubular body of the valve. The shutter and the control member have magnetized portions and the control member can be moved along the body so that the magnetic attraction exerted when the control member is moving causes movement of the shutter to open or to close the outlet orifice of the valve. In that valve, the external control member is moved by a pneumatic system that is integrated into the body of the valve.

However, such a device has the drawback of high friction forces between the shutter and the inside wall of the chamber because the shutter, which is attracted by the externally situated magnet, may stick more or less strongly to said inside wall. This results in the risk of premature wear of the wall and/or the shutter and/or of deposition of particles in the chamber and their passage into the liquid to be distributed; furthermore, this kind of valve is difficult to clean, in particular in the friction areas, in, which the cleaning liquid cannot circulate or can circulate only with difficulty.

SUMMARY OF THE INVENTION

The object of the invention is to provide a valve arrangement in which the areas of friction between the body of the valve and the shutter are reduced or even eliminated in order to overcome the mentioned drawbacks.

According to the invention, a valve comprising a shutter placed in a chamber provided in the valve body, one end of said chamber being provided with a seat which a plug-forming part of the shutter rests against in a closed position of the valve and is remote from in an open position thereof and a magnetic control device including shutter magnetic drive means disposed outside the chamber for moving it either to its closed position or to its open position is characterized in that the magnetic control device further comprises at least one ball which is made of a magnetic material, disposed in the chamber and coupled to the external magnetic drive means, said ball being associated with the shutter in such a way that said shutter is driven in the chamber when the ball is moved by the magnetic drive means.

According to other features of the invention:
the ball turns freely relative to the shutter;
the shutter includes at least one housing in which at least one ball is placed;
the valve is adapted to enable centering of the shutter in the valve body;
the shutter is associated with at least two balls that cooperate therewith and the body of the valve to provide centering by the external magnetic drive means;
the centering means are disposed inside the chamber, on the lateral wall thereof, to cooperate with the shutter;
the centering means are disposed on the shutter to cooperate with the internal lateral wall of chamber;
the centering means are fins;
the shutter is associated with at least two balls offset longitudinally relative to the axis of the shutter;
at least one section of the shutter is associated with at least two balls that are offset angularly relative to each other;
two separate sections of the shutter are each associated with at least two balls disposed so that the circumferential offset between two successive balls of the same section is less than or equal to 180°;
the (n) balls of a section are offset angularly by an angle equal to 360°/n.

BRIEF DESCRIPTION OF THE DRAWINGS

Other features and advantages of the invention will become apparent on reading the following detailed description given with reference to the appended drawings, in which.

DETAILED DESCRIPTION OF THE INVENTION

Figure 1:
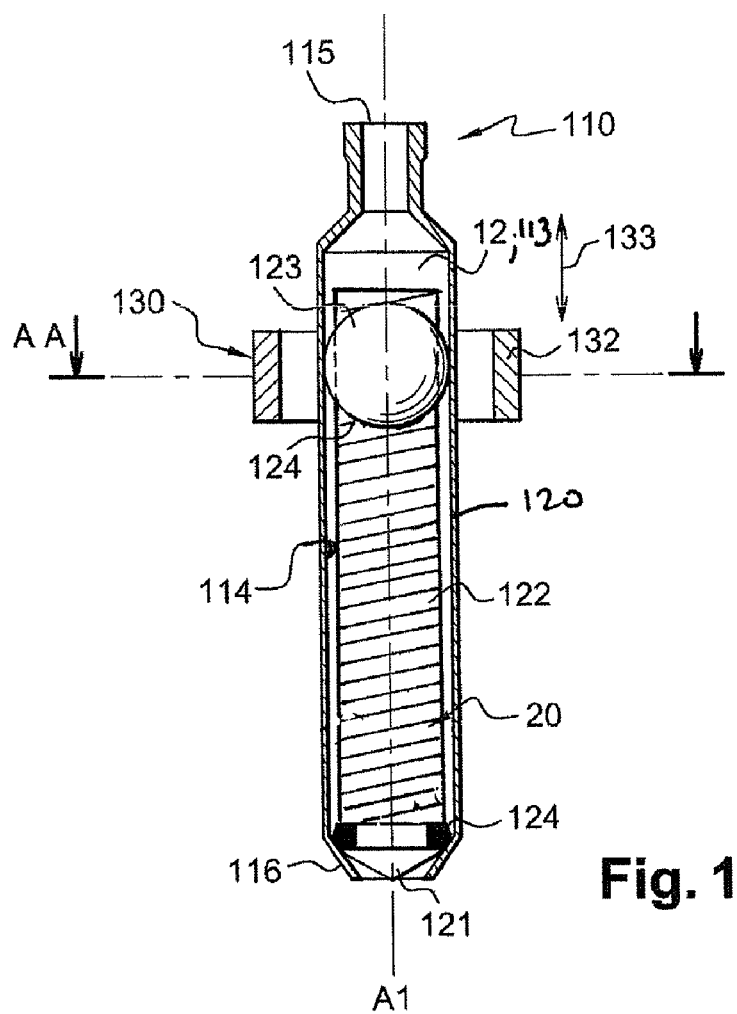
FIG. 1 is a diagrammatic view in axial section of one embodiment of a valve of the invention whose magnetic control device comprises a single ball.

In FIG. 1 a valve 110 is shown that is intended to be installed in a container filling installation, for example.

The valve 110 has a tubular general structure. At its center it includes a chamber 12, here of cylindrical section, which is delimited by a central tube having an axis A1.

In the following description, the terms lower, upper, top, bottom, etc. are used with reference to the drawings for easier comprehension. They must not be understood as being limiting on the scope of the invention, in particular with regard to the orientation of the valve. The vertical orientation of the axis A1 of the valve is merely appropriate to one preferred embodiment of the invention.

In the present example, the upper portion of the valve includes an orifice 115 which is adapted to be connected to a supply tank (not shown) and which opens into the chamber 12. The section of this orifice 115 is smaller than the cross section of the chamber 12. The lower portion of the chamber 12 ends at a closure seat 116 adapted to receive a corresponding portion of the shutter 20. The seat 116 has a frustoconical general shape and is extended in the downward direction by a cylindrical portion of smaller diameter than the chamber 12 forming the outlet orifice of the valve as such.

The shutter 20 has two main portions:
- a first portion forming a plug 121 made of non-magnetic material which has a frustoconical section and is adapted to cooperate with the seat 116 of the valve in the closed position of the valve. The seal is reinforced by a seal 124 around the plug 121.
- a second portion in the form of a stem 122 which is axially aligned with the plug and consists of a non-magnetic material such as stainless steel. The outside cross section of the stem 122 is everywhere less than the inside cross section of the chamber 12 so that the shutter 20 is able to move freely in the chamber 12 both ways along the axis A1.

According to the invention, the control device comprises drive means 130 based here on coils or magnets 132 placed outside the body of the valve, and thus of the chamber 12, and a magnetic material ball 123 placed inside the chamber 12.

The ball is made of soft iron, pure iron or an alloy of one or both of these materials, for example.

According to the invention, the ball 123 is associated with the shutter 20 in order to drive it in translation in the body of the valve when the ball itself is driven by the coils or magnets 132. To this end, a transverse housing 124 is formed in the body of the shutter 20, for example in the vicinity of the top of the stem, and the ball is disposed in the housing. The dimensions of the housing are such that the ball can turn freely inside it.

Moreover, the diameter of the ball 123 is significantly less than the inside cross section of the chamber 12, so that the ball can roll freely in the chamber 12 whilst being held in the housing 124 of the shutter 20, in which it also turns freely.

In a manner known per se, the drive means 130 including the coils or magnets 132 are placed outside the valve body, and can be moved in a direction parallel to the axis A1 (double-headed arrow 133), either downwards (valve closing direction) or upwards (valve opening direction) in such a manner as simultaneously to drive the ball, which in turn moves the shutter 20. The drive means 130 may be moved by any appropriate drive device (not shown) such as a piston-and-cylinder.

Figure 2:
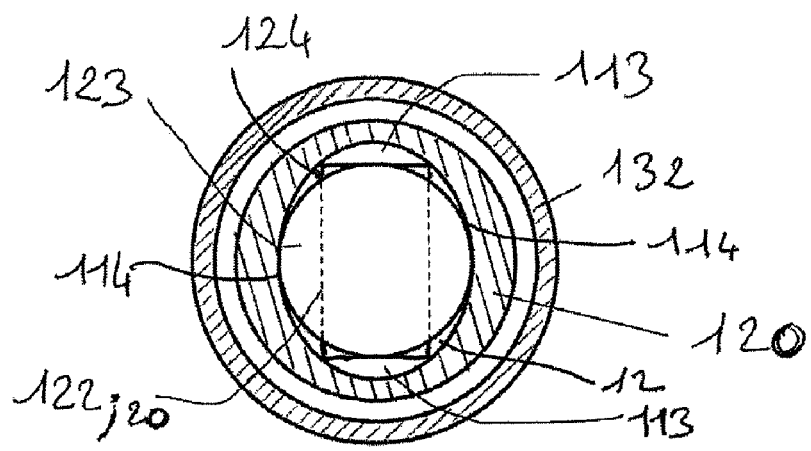
FIG. 2 is a diagrammatic view in cross section taken along the line AA in FIG. 1.

FIG. 2 is a diagrammatic view of the FIG. 1 control device in cross section taken along the line AA in FIG. 1. It shows the whole of the tubular valve body delimiting the chamber 12 in which the shutter 20 moves. The drive means 130 are outside the body of the valve. In the present example, the drive means 130 carry two diametrically opposed magnets 132 on respective opposite sides of the outside wall of the tubular body so as to orient the magnetic flux lines so that they converge substantially toward the center of the ball 123 to achieve the best possible coupling.

At least one longitudinal groove 113 is machined into the inside wall 120 of the chamber to allow the fluid to pass on either side of the ball 123. At least two grooves 113 are preferably provided, as in the present example, evenly distributed at the periphery of the chamber: here two diametrically opposed grooves are shown. They are machined across the whole of the axial section of the chamber 12. The ball is trapped between two circular arc-shaped areas 114 that are separated from each other by the grooves 113, the distance between the two areas being slightly greater than the diameter of the ball, and the magnets are preferably disposed facing these areas. Thus the ball "rolls" preferentially on one of these areas, which constitutes a rolling area, according to the orientation of the magnetic field produced by the coils or magnets. It should be noted that the other area is not in contact with the ball, but facilitates centering it when assembling the valve; what is more, it could very well become a bearing area if the magnets were fitted the other way around, for example following a maintenance operation. When the shutter is moved to the open position, the fluid can flow in the two grooves 113 provided for this purpose.

The valve is moved to the closed position or the open position by moving the magnetic control device in the appropriate direction. Operation is optimized if the valve is positioned as shown in the figures, i.e. with the liquid inlet at the top and the outlet at the bottom, with the drive means disposed at a level lower than the ball when the valve is closed: with this kind of configuration, the plug tends to be forced onto the seat not only by magnetic attraction but also by the static pressure exerted on the ball.

The mode of operation that has just been described is exactly the same for other embodiments of the present valve except that the control device, i.e. the drive means 130, and the number of balls and their disposition in the shutter 20 are modified.

Figure 3:
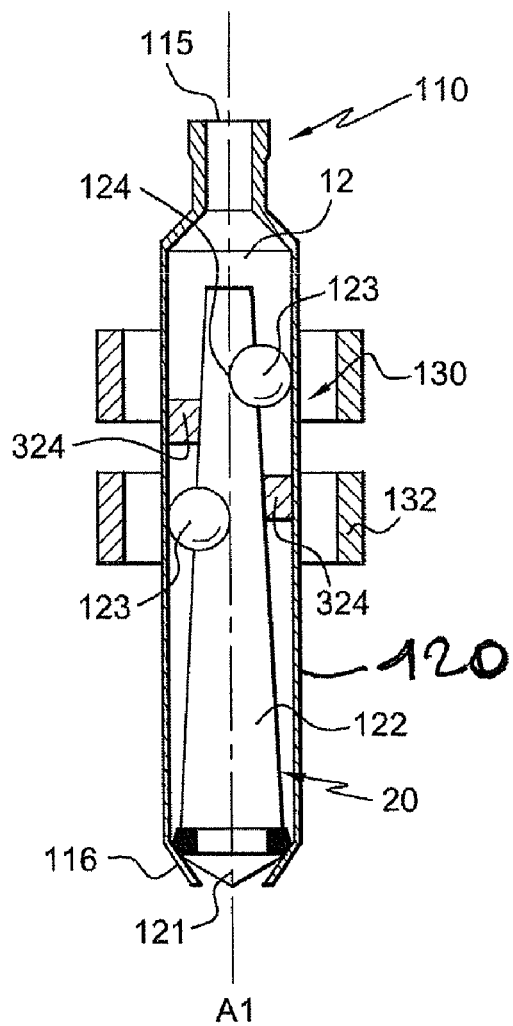
FIG. 3 is a diagrammatic view in axial section of a first embodiment of the valve of the invention whose magnetic control device comprises two balls that are not placed on the same section.

In the FIG. 3 embodiment, the valve 110 has a tubular general structure, is made from a non-magnetic material and delimits the chamber 12. The fluid flows in the gap between the shutter 20 and the chamber 12.

In this embodiment, in a similar way to what is shown in FIGS. 1 and 2, the its upper portion of the valve includes an orifice 115 that is adapted to be connected to a supply tank (not shown) and opens into the chamber 12. This orifice 115 has a section smaller than the cross section of the chamber 12. The lower portion of the chamber 12 ends at a closure seat 116 adapted to receive a corresponding portion of the shutter 20. The seat has a frustoconical general shape and is extended in the downward direction by a cylindrical portion of smaller diameter than the chamber 12 forming the outlet orifice of the valve as such. The seat 116 seals the valve when closed by the facing plug 121.

As can be seen in FIG. 3, the diameter of the upper portion of the stem 122 of the shutter is less than that of the chamber 12 and tends to increase in a frustoconical manner from the upper portion to the lower portion in which the plug 121 is located.

In this embodiment, the first portion of the control device of the shutter 20 comprises two balls 123 offset axially and diametrically. Two centering members 324 in the form of non-magnetic material lugs or fins for stabilizing the shutter 20 are placed on the stem 122 of the shutter 20 or alternatively on the inside wall 120 of the chamber 12 and center the shutter 20 in the chamber 12 at the same time as allowing free movement of the shutter 20; in other words, a gap is left between the centering members 324 and the inside wall 120 of the chamber 12 or alternatively the stem of the shutter 20.

In this embodiment, the stem is provided with as many housings 124 as the device includes balls. Each housing 124 has dimensions such that when the shutter 20 is fitted, i.e. centered by the centering members 324, each housing receives a ball, which can turn freely in said housing and on the lateral inside wall 120 of the chamber 12.

Here the drive means 130 are such that each of the balls is associated with at least one coil or one magnet 132 of its own. Moreover, the coil(s) or magnet(s) 132 are fastened together so that they move at the same time.

The embodiment that has just described is merely one nonlimiting example of the invention. Other constructive dispositions might be encountered in which the distribution of the balls on the shutter 20 or the distribution of the bearing members 324 on the body of the shutter 20 or in the chamber 12 are modified.

In operation, the valve is normally held closed by the magnetic control device, which tends to cause the plug to bear on the seat, as well as by the weight of the shutter 20 and by the static pressure that is exerted on the balls if the coils or magnets 132 are disposed at a level such that their force of attraction is below the diametrical plane of the balls and if the valve is disposed vertically as shown in FIG. 3 (with the plug at the bottom). In use, the drive means 130 and therefore the coil(s) or magnet(s) 132 are moved and the magnetic attraction tends to move the balls that drive the shutter 20.

Figure 4:
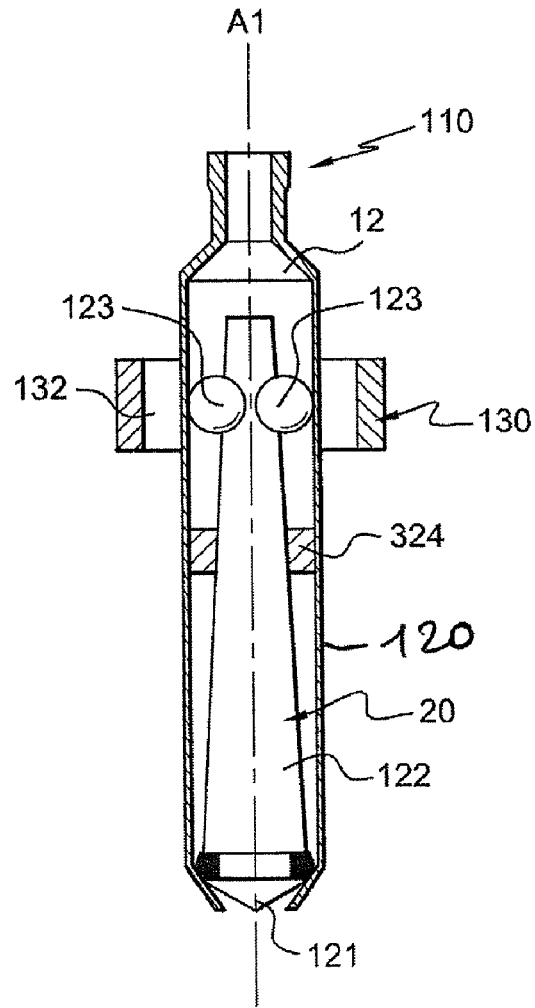
FIG. 4 is a diagrammatic view in axial section of a second embodiment of the valve of the invention whose magnetic control device comprises two balls that are placed on the same section.

FIG. 4 shows another embodiment in which the control device includes two diametrally opposed balls placed on the same cross section. This arrangement further improves the operation of the shutter 20.

The control device further includes drive means 130 adapted to take account of the arrangement of the two balls 123 on the same section. To this end, the drive means 130 include a cylindrical magnetic body that carries two diametrally opposed magnets 132 disposed on respective opposite sides of the outside wall of the tubular body delimiting the chamber 12 to obtain the best coupling between the magnets and the two balls.

Centering is improved by providing bearing members 324 under the control device consisting of the balls and on the tubular body of the valve or on the body of the shutter 20 to achieve the best possible centering. In the example shown, these members are fins carried by the shutter 20.

Figure 5:
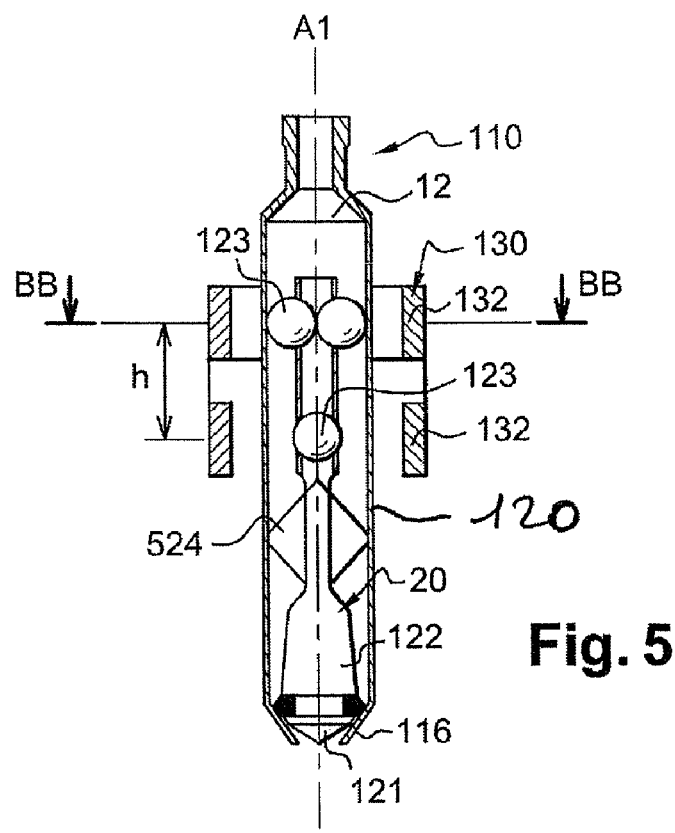
FIG. 5 is a diagrammatic view in axial section of a third embodiment of the valve equipped with two magnetic control devices each comprising two balls placed on the same cross section.

FIG. 5 shows another valve embodiment similar to those described above except that centering is achieved in a different way. In fact, the valve comprises two identical control devices, each of which includes two balls 123 placed on the same cross section of the shutter 20. The two devices are centered on the axis A1 of the valve but are offset longitudinally on that axis by a distance "h" and are offset circumferentially relative to each other, preferably at 90°, for better distribution of the lifting force and better centering of the shutter 20. In other words, the two balls of a first device are carried by a first plane passing through the axis A1 of the valve and the two balls of the second device are carried by a second plane passing through the axis A1 of the valve and perpendicular to the first one; also, the two balls of the same device are disposed on the same section perpendicular to the axis A1; the two balls of the other one are carried by a second section perpendicular to the axis A1 but offset from the first one by a distance "h". As shown, guiding is preferably completed in a manner known in the art by two perpendicular fins 524 interleaved with each other and offset longitudinally relative to the control devices, here placed downstream of the devices in the direction of flow of the fluid, and carried by the stem of the shutter 20. The stem 122 of the shutter 20 terminates in a frustoconical portion under which the plug 121 is situated.

This embodiment of the valve includes drive means 130 with two sets of coils or magnets 132 that are mechanically linked to each other to move at the same time and are disposed so that one provides the coupling with the two balls of one section and the other with the two balls of the other section, offset by a distance "h".

Figure 6:
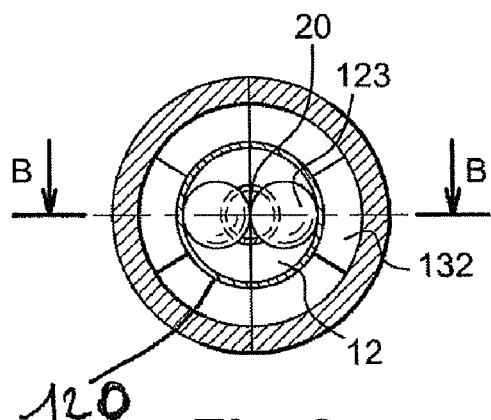
FIG. 6 is a diagrammatic view in cross section of one of the FIG. 5 control devices.

FIG. 6 is a diagrammatic view of one of the control devices in cross section taken along the line BB in FIG. 5. It shows the whole of the tubular body of the valve delimiting the chamber 12 in which the shutter 20 slides by means of balls each of which is disposed in a respective housing of the shutter 20. Outside the body of the valve are the drive means 130 that include a cylindrical magnetic body that carries two magnets 132 whose magnetic poles are preferably reversed relative to each other. They are placed on respective opposites sides of the outside wall of the tubular body to cause the magnetic flux to converge towards the two balls 123 in order to obtain the best coupling.

Figure 7:
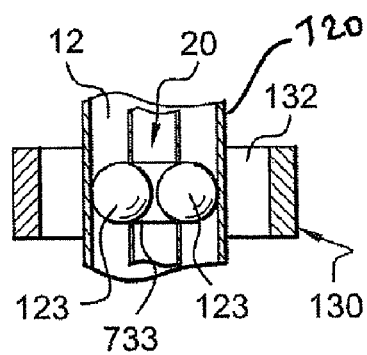
FIG. 7 is a diagrammatic view in axial section of what is shown in FIG. 6, and constitutes a more detailed view of the areas immediately above and below the section line BB in FIG. 5.

FIG. 7 is a view of the arrangement of the balls 123 and the shutter 20 in the chamber 12 of the valve in axial section taken along the line B-B in FIG. 6. In the same cross section of the shutter 20 there is a hole 733 whose diameter is such that the two balls 123 of the same section cannot stick together because of magnetic attraction. This arrangement is introduced into the chamber 12 of the valve so that it slides freely in translation. The other portion of the control device, i.e. the drive means 130 with the coils or magnets 132 is on the same cross section but outside the valve body.

The operation of this type of valve is identical to that described with reference to the previous figures.

In the embodiment described with reference to FIGS. 8 and 9, the latter figure being a view in section taken along the line CC in FIG. 8, the valve includes drive means 130 with two sets of coils or magnets 132 placed outside the body of the valve and offset longitudinally on the axis A1 so that each magnetizes two balls 123 disposed on the same cross section of the shutter. The two sets of coils or magnets 132 are also fastened together so that they move at the same time. Each set is similar to the FIG. 5 set, i.e. it includes a body with two coils or magnets 132 on respective opposite sides of the outside wall of the tubular body so as to orient the magnetic flux lines to obtain the best coupling with the balls.

The shutter 20 terminates in a plug 121 in its lower portion extending the stem. A seal 829 preferably surrounds the plug, as shown here.

The plug has a frustoconical section intended to cooperate with a seat 116 of the valve to provide a seal in the closed position.

The shutter 20 is preferably machined from a single blank so that fitting it does not necessitate any welding which could introduce the risk of causing deformation at the level of the joint when it is being welded. That kind of operation would therefore have the effect of diminishing the accuracy of the centering of the shutter 20 in the chamber.

Figure 8:
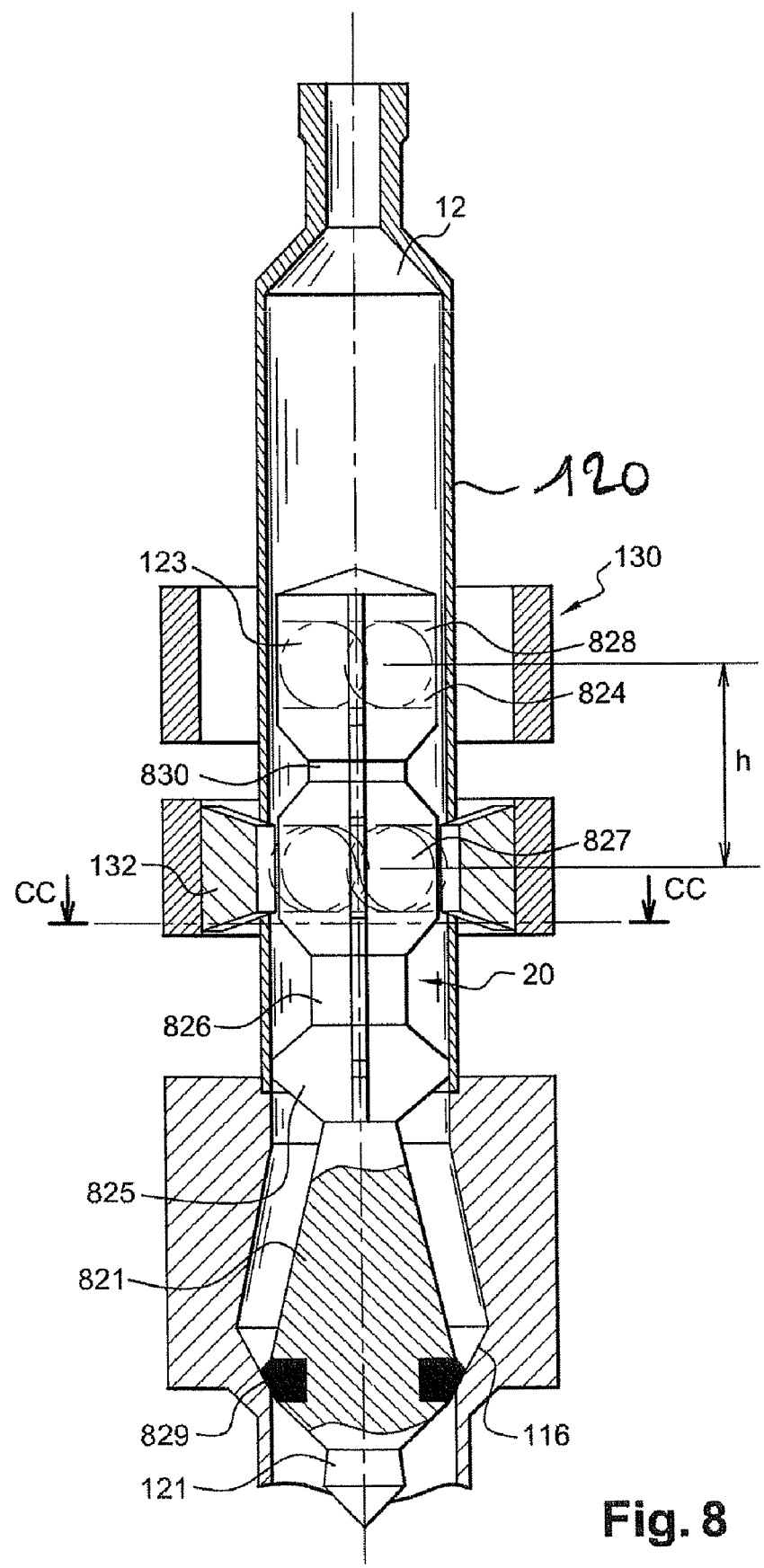
FIG. 8 is a diagrammatic view in axial section of another embodiment with more than one ball.
Figure 9:
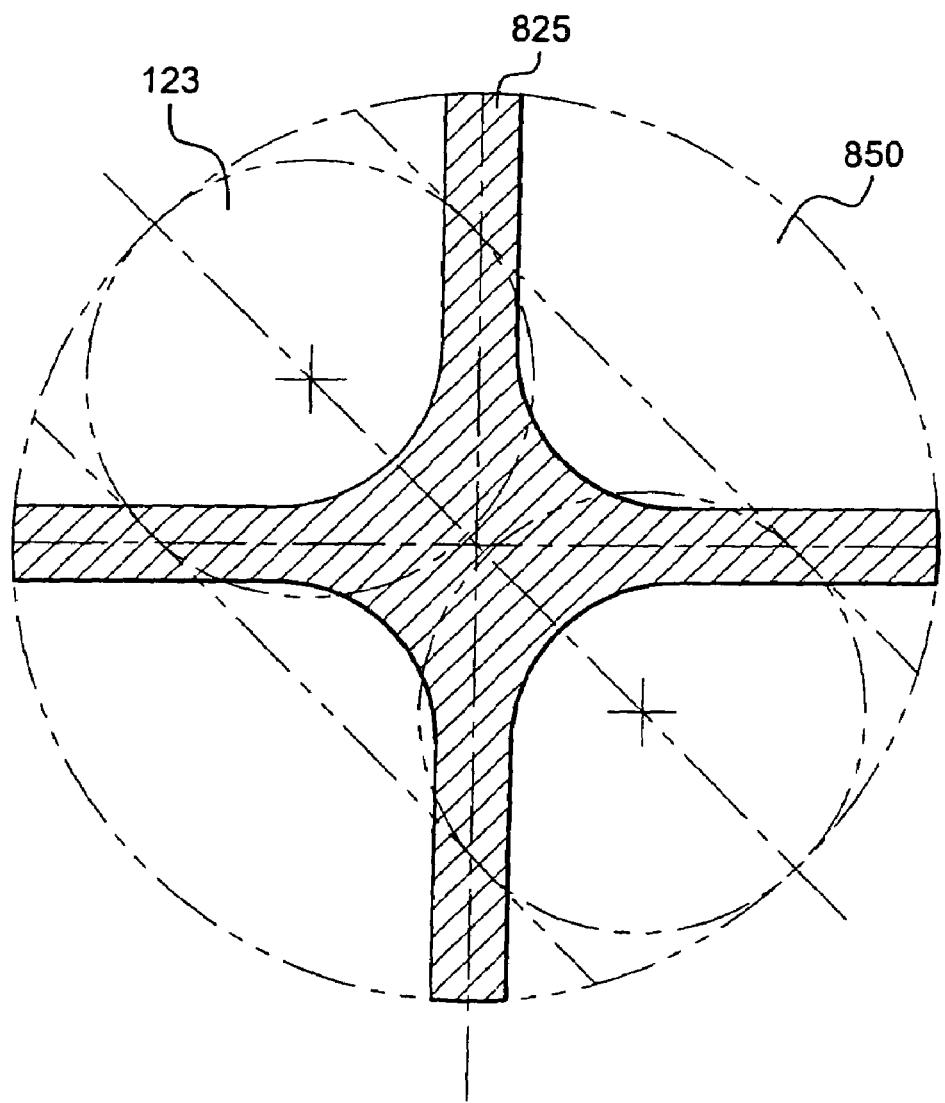
FIG. 9 is a diagrammatic view of the FIG. 9 valve in cross section taken along the line CC in a plane defined by a ball and the drive means.

As can be seen in FIG. 8, the plug is surmounted by another frustoconical section 821 that is surmounted by two perpendicular fins 825 interleaved one within the other that center the shutter 20 in the chamber 12 of the valve at the same time as allowing the liquid to circulate between the fins 825 at 950 (FIG. 9).

The fins are surmounted by a cylindrical portion 826 whose diameter is less than the diameter of the chamber 12 and which is itself surmounted by two other portions 827, 828 that are offset longitudinally by a distance "h" and each of which contains the two balls 123 mentioned above placed on the same cross section. These two portions 827, 828 are separated from each other by a cylindrical intermediate section 830. As before, the balls in the same section are preferably diametrally opposed; the balls are offset circumferentially by 90° from one section to the other.

The inside diameter of the chamber is preferably substantially equal to the sum of the diameters of the two balls.

The balls of the same section are disposed in a housing 824 consisting here of a transverse bore formed in the stem which has a diameter significantly greater than that of the balls so that the latter may move freely therein. It should be noted that the fins 825 are machined from the same blank as the stem.

FIG. 9 is a view in section taken along the line CC in FIG. 8 showing the shutter with the housing 824 in which the two balls 123 of the section are housed, the relative disposition of the balls and the fins 825 and the passages 850 that are left free for the fluid.

Of course, the invention is not limited to the embodiments described and design variants may be applied thereto without departing from the scope of the invention as defined by the claims. In particular, the control device may be equipped with a different number of balls (more than two balls per section; more than two sections equipped with balls).

Although the only embodiments shown in the figures are on/off valves, the production of variable flow valves may be envisaged, for which purpose it suffices to vary the dimensions of the gap between the chamber 12 and the shutter 20.

The invention claimed is:

1. A valve comprising:
 a valve body;
 a chamber provided in said valve body, said chamber having an end with an outlet and a seat;
 a shutter provided in said chamber;
 a plug-forming part provided on said shutter, the plug-forming part configured to rest against the seat to close the outlet in a closed position of the valve and configured to be remote from the seat in an open position of the valve; and
 a magnetic control device including:
  external magnetic driving means disposed outside the chamber, and;
  a magnetically driven member which is made of a magnetic material, which is disposed in said chamber and which is magnetically coupled to said external magnetic driving means;
 wherein said magnetically driven member engages said shutter such that said shutter is driven to the open position or to the closed position by the magnetically driven member when said magnetically driven member is moved by said external magnetic driving means;
 wherein the shutter is configured to allow the at least one ball to freely rotate and roll along an inside surface of the valve body, thereby preventing the shutter from contacting a side wall of the valve body.

2. The valve as claimed in claim 1, wherein said at least one ball turns freely relative to said shutter.

3. The valve as claimed in claim 1, wherein said shutter includes at least one housing in which said at least one ball is housed.

4. The valve as claimed in claim 1, wherein said valve includes centering means adapted to center said shutter in said valve body.

5. The valve as claimed in claim 4, wherein said magnetically driven member comprises at least two balls that cooperate with said shutter and said valve body so that said centering is provided by said external magnetic driving means.

6. The valve as claimed in claim 4, wherein said centering means are disposed inside said chamber, on a lateral wall (120) thereof, so as to cooperate with said shutter.

7. The valve as claimed in claim 4, wherein said centering means are disposed on said shutter so as to cooperate with an internal lateral wall (120) of said chamber.

8. The valve as claimed in claim 4, wherein said centering means are disposed inside said chamber, on a lateral wall thereof; and
 wherein said centering means are fins.

9. The valve as claimed in claim 1, wherein said magnetically driven member comprises at least two balls that are offset longitudinally relative to the axis of said shutter.

10. The valve as claimed in claim 1, wherein said magnetic driven member comprises at least two balls that are offset angularly relative to each other and that are associated with at least one portion of said shutter.

11. The valve as claimed in claim 1, wherein said magnetic driven member comprises at least two balls that are associated with two separate portions of said shutter; and
 wherein the two balls are disposed so that an angular offset between two successive balls of a same portion is less than or equal to 180°.

12. The valve as claimed in claim 1, wherein (n) balls are provided in a portion and are offset angularly by an angle equal to 360°/n.

13. The valve as claimed in claim 1, wherein at least one fluid passage groove is provided in an inside wall (120) of said chamber, and wherein a rolling area is provided on either side of said groove.

14. The valve as claimed in claim 1, wherein said external magnetic driving means are adapted to be moved along a direction parallel to the longitudinal axis of said valve while driving said at least one ball simultaneously.

15. The valve as claimed in claim 14, wherein said external magnetic driving means comprise at least one magnet.

16. The valve according to claim 3, wherein said at least one ball protrudes in part outside said at least one housing so that said at least one ball is in rolling contact with an inner wall of the chamber.

17. The valve according to claim 1, wherein the shutter extends axially within the valve body and the at least one ball is held at least in part by the shutter between the distal ends of the shutter.

18. The valve according to claim 1, wherein the at least one ball is disposed between a central longitudinal axis of the shutter and a wall of the chamber.

19. The valve according to claim 1, wherein the at least one ball provides rolling bearing support for the shutter as the shutter moves between the open position and the closed position.

20. The valve according to claim 1, wherein the at least one ball pushes the plug forming part to the closed position and pulls the plug-forming part to the open position.

21. The valve according to claim 1, wherein the shutter partially surrounds the at least one ball such that a portion of the shutter is disposed between the at least one ball and an inlet to the chamber; and
 wherein the shutter partially surrounds the at least one ball such that a portion of the shutter is disposed between the at least one ball and the outlet to the chamber.

22. A valve comprising:
 a tubular body comprising an outlet and a seat surrounding the outlet;
 a shutter disposed inside the body, wherein the shutter is configured to close the outlet by contacting and forming a seal with the seat and wherein the shutter opens the outlet by being lifted from the seat;
 at least one ball made of magnetic material held at least in part by the shutter, wherein the shutter is configured to allow the at least one ball to freely rotate and roll along an inside surface of the tubular body, thereby preventing the shutter from contacting a side wall of the tubular body;
 a magnetic device disposed outside the tubular body which magnetically attracts the at least one ball such that when the magnetic device moves the at least one ball moves;

wherein the at least one ball pulls the shutter to the open position and wherein the at least one ball pushes the shutter to the closed position.

23. The valve according to claim 22, wherein the at least one ball protrudes beyond the shutter to rollingly engage the inside surface of the tubular body.

24. The valve according to claim 22, wherein the shutter extends axially within the tubular body and the at least one ball is held at least in part by the shutter between distal ends of the shutter.

25. The valve according to claim 22, wherein the at least one ball is held by the shutter between a central longitudinal axis of the shutter and an inside surface of the tubular body.

26. The valve according to claim 22, wherein the at least one ball provides rolling bearing support for the shutter as the shutter moves between the open position and the closed position.

* * * * *